July 19, 1966  J. A. FOERSTER  3,262,078
COMBINED ENCLOSURE AND FLUX RETURN MEANS FOR POTTED COILS
Filed Sept. 3, 1964  2 Sheets-Sheet 1

INVENTOR.
JAMES A. FOERSTER
BY
Lockwood, Woodard, Smith & Weikart
Attorneys

July 19, 1966     J. A. FOERSTER     3,262,078
COMBINED ENCLOSURE AND FLUX RETURN MEANS FOR POTTED COILS
Filed Sept. 3, 1964     2 Sheets-Sheet 2

*INVENTOR.*
JAMES A. FOERSTER
BY
*Lockwood, Woodard, Smith & Weikart*
Attorneys

United States Patent Office 3,262,078
Patented July 19, 1966

3,262,078
COMBINED ENCLOSURE AND FLUX RETURN MEANS FOR POTTED COILS
James A. Foerster, Fort Wayne, Ind., assignor to Wabash Magnetics, Inc., Wabash, Ind., a corporation of Indiana
Filed Sept. 3, 1964, Ser. No. 394,140
3 Claims. (Cl. 336—67)

The present invention relates to a coil arrangement.

In certain phases of the electrical industry, it is necessary to obtain approval or acceptance of Underwriters' Laboratories before an effective commercial development of an item can be accomplished. Prior to the present invention, it had been the prevailing concept and standard accepted by Underwriters' Laboratories and those who use their services that a coil which is in an exposed location requires an enclosure which is a minimum of #22 gauge sheet steel or heavier when cast of metal. Furthermore, it has been the previous belief that the coil winding insulation and enclosure requirements should be separate for coils in exposed locations.

An important object of the present invention is to provide a coil arrangement wherein the coil wrapper and the enclosure of the coil are combined.

Another object of the invention is to provide a coil arrangement which eliminates the use of flux bars and the like.

A further object of the invention is to provide a coil arrangement using a specially formulated compound which is flame retardant, has impact resistance, and has electrical properties and thermal properties which make possible the coil arrangement meeting Class A (110° C.) and Class B (120° C.) Underwriters' Laboratories requirements.

Related objects and advantages will become apparent as the description proceeds.

In accordance with the invention, there is provided an improved ultimate enclosure for a coil wherein the means for insulating and protecting the coil also acts as the means for mounting the coil and for providing a return flux path for the coil.

The full nature of the invention will be understood from the accompanying drawings and the following description and claims.

Figure 2:
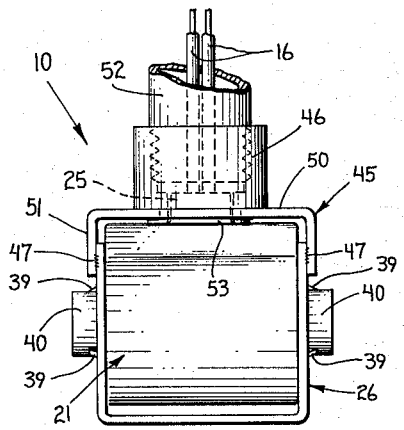
FIG. 2 is a side elevation of the coil of FIG. 1 in assembled condition.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to the drawings, there is illustrated a coil arrangement 10 including a bobbin 11 upon which a coil 12 of insulated wire is wound. After winding has been completed, a layer of cross-over insulation 15 is placed on the outer periphery of the coil and lead wires 16 are connected to the ends of the coil of wire at 17. The lead wires 16 are then secured in place to the bobbin and coil by an anchor 20 of pressure sensitive wrapping tape.

Figure 1:
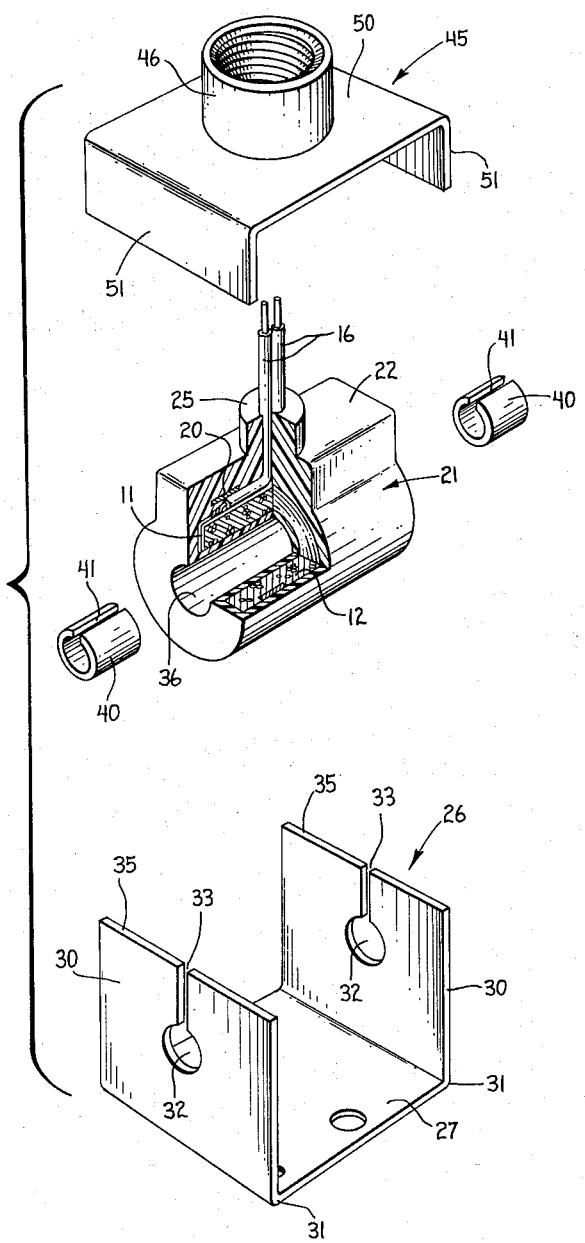
FIG. 1 is an exploded perspective view of a coil arrangement embodying the present invention.

The bobbin with coil thereon is now ready for encapsulation within encapsulating material 21 to form the configuration of encapsulating material illustrated in FIG. 1. The encapsulation procedure is accomplished in conventional fashion by a similar process to that disclosed in the patent to B. F. Forrest et al., 2,856,639. The encapsulation material 21 is an epoxy which is self-extinguishing and which has higher than typical impact strength. Specific examples of the mixture used in forming the encapsulating material 21 are described in detail below.

It will be noted that the encapsulating material 21 has a generally cylindrical shape approximating but larger than the shape of the bobbin and coil but rectangular in shape at the portion 22 of the material where the lead wires leave the encapsulating material. Encapsulating material 21 is also formed with an integral raised collar 25 on the rectangular shape or configuration 22 with the lead wires 16 exiting from the encapsulating material through the collar 25.

The coil arrangement further includes a sheet metal ferrous yoke 26 having a flat rectangular base 27 and a pair of flat legs 30 having the same width as the base 27 and projecting perpendicularly from the opposite ends 31 of the base 27. The legs 30 have circular apertures 32 therethrough and slots 33 which lead from the distal ends 35 of the legs 30 to the leg apertures 32. When the coil arrangement is assembled as illustrated in FIG. 2, the leg apertures 32 are aligned with the aperture 36 which extends coaxially through the bobbin 11 and the encapsulating material 21. The purpose of the slots 33 is to prevent eddy currents.

A pair of longitudinally split cylindrical members 40 are resiliently deformed to narrow the longitudinal split 41 and are press-fitted within the ends of the aperture 36 through the encapsulating material and the aperture 32. Thus, the cylindrical members 40 mount the coil with its encapsulating material 21 on the yoke. A metal forming machine is operated within the members 40 to deform them and produce a plurality of protuberances 39 on the inside and the outside of the legs 30 to firmly and securely mount the members 40 on the legs 30.

Fixedly mounted upon the yoke 26 by spot welds 47 is a conduit attachment 45 having an internally threaded fixedly mounted collar 46 thereon. The conduit attachment 45 has a flat rectangular base 50 and a pair of flat legs 51 which have the same width as the base 50 and the same width as the legs 30 and the base 27. When the encapsulating material 21 is mounted within the yoke 26 and conduit attachment 45 as illustrated in FIG. 2, the rectangular portion 22 of the encapsulating material abuts an annular flange 53 formed on the collar 46 when the collar is secured to the conduit attachment 45. It can also be seen from FIG. 2 that the collar 25 projects into the collar 46 and that the lead wires 16 extend through the collar 46 and through a section of conduit 52 threadedly connected to the collar 46.

Figure 3:
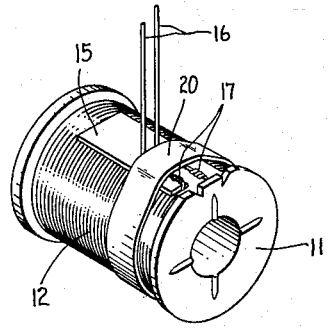
FIG. 3 is a perspective view of a bobbin with a coil of wire wound thereon, said bobbin and coil forming a part of the structure of FIGS. 1 and 2.
Figure 4:
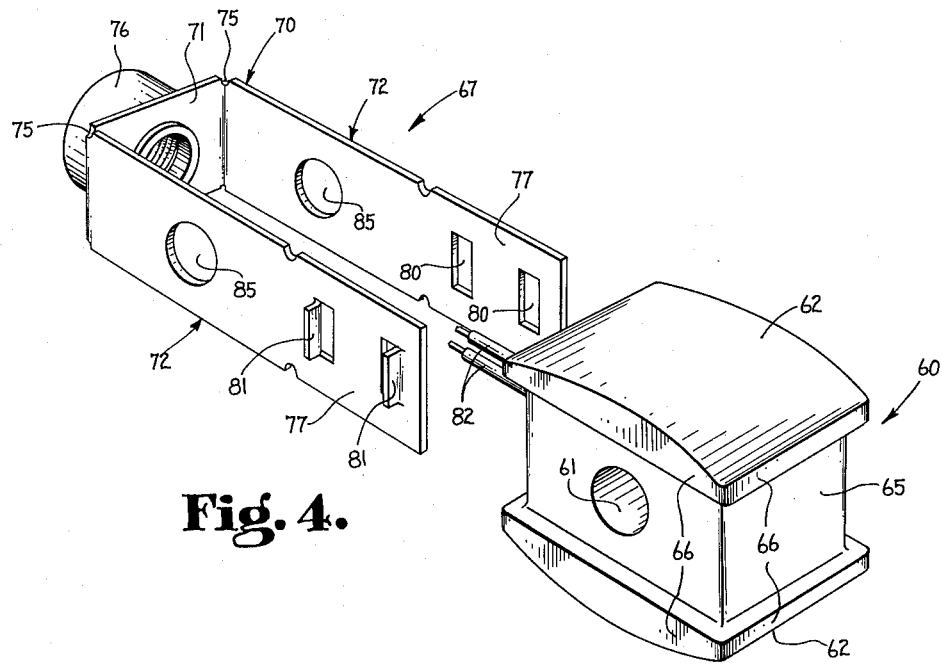
FIG. 4 is a perspective view showing a step in the assembly of a coil arrangement forming a further embodiment of the present invention.
Figure 5:
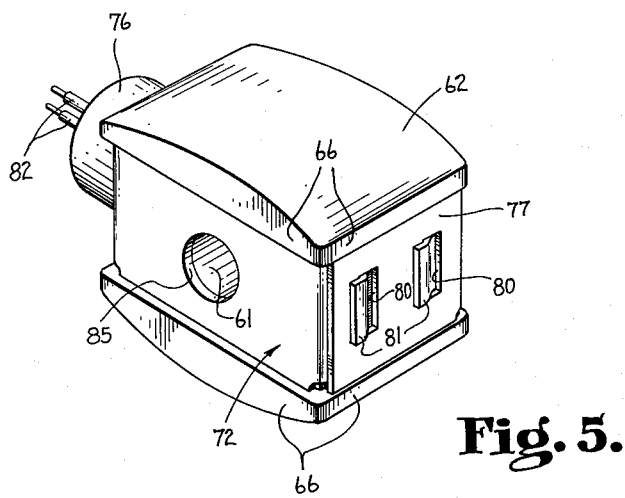
FIG. 5 is a perspective view of the assembled coil arrangement of FIG. 4.

Referring to FIGS. 4 and 5, an alternative embodiment of the invention is illustrated and comprises a coil and bobbin identical to that illustrated in FIG. 3 which is encapsulated within encapsulating material 60 in the form of a three dimensional rectangular shape. The encapsulating material 60 has an aperture 61 through the central portion thereof and coextensive with the axial aperture through the bobbin within the material 60. The material 60 has enlarged rounded end portions 62 which are joined by a central portion 65 reduced in size relative to the end portions 62. The enlarged end portions 62 define flanges 66 which surround the central portion 65. A frame 67 formed of magnetic material such as steel or the like includes a flat strap 70 having a flat rectangular base 71 and a pair of flat legs 72 which are the same width as the base 71 and which project perpendicularly from the opposite ends 75 of the base.

The base 71 has a cylindrical internally threaded collar or conduit 76 secured thereto in the same fashion as the securement of the collar 46. The legs 72 have distal ends 77 which are punched out to form openings 80 through one of the distal ends 77 and tabs 81 projecting from the other of the distal ends.

The width of the strap 70 is equal to the width of the central portion 65 between the flanges 66 so that the strap 70 engages the flanges 66 when the device is assembled as illustrated in FIG. 5. In assembling the device, the lead wires 82 are projected through the conduit 76 and the base 71 is caused to abut the central portion 65. The leg distal ends 77 are then bent over to engage one another and the projections 81 are bent over within the openings 80 to securely anchor the strap around the central portion 65 of the encapsulating material 60. It will be noted that the legs 72 have apertures 85 which are coextensive of the aperture 61 through the encapsulating material 60.

The epoxy resin used as the encapsulating material 21 or 60 is formulated as follows:

From 0 to 180 parts of an epichlorhydrin-4,4'-dihydroxydiphenylalkane condensation product are mixed with from 10 to 100 parts of a condensation product of epichlorhydrin and a C18-dicarboxylic acid at a temperature in the range 60–80° C. the mixture is then cooled to about 40° C. and from 5 to 100 parts of the anhydride of aliphatic dicarboxylic acid are added per 100 parts of the mixture. Next, from 0 to 400 parts of a fibrous inorganic filler, 0 to 200 parts of antimony oxide and 0 to 1000 parts of silicon flour are added per 100 parts of the hardened resin and the resulting mixture agitated to dispense and wet out the filler fibers.

In the above composition, I have found that a useful example of an epichlorhydrin-4,4'-dihydroxyphenylalkane condensation produce is one prepared from epichlorhydrin and bisphenol A (2,2-bis(4-hydroxyphenyl) propane). I have also found it advantageous as regards the fire retardant properties of the resulting material to substitute a tetrabrominated bisphenol A for all or part of the bisphenol A in the condensation reaction with epichlorhydrin. Other useful dihydroxyphenyl alkanes include 4,4'-dihydroxyphenyl methane; 4,4' - dihydroxyphenyl - 2,2',6,6'-tetrachlorophenyl ethane and the like. I prefer to employ a C18-dicarboxylic acid to condense with epichlorhydrin to form the second resin of my improved composition although other long chain dicarboxylic acids are fully operative.

Aliphatic carboxylic acid anhydrides which are useful in preparing my novel encapsulating compositions include anhydrides of alkyldicarboxylic acids such as succinic anhydride, azelaic anhydride, maleic anhydride and the like as well as cycloaliphatic anhydrides such as cyclohexane-1,2-dicarboxylic acid anhydride, bicyclo (2.2.1) heptene-2,3-dicarboxylic acid anhydride, methyl bicyclo (2.2.1)-2-heptene-2,3-dicarboxylic acid anhydride and the like.

A mixture prepared as above is cured for final use by the addition thereto of a minute amount (0.01–0.5 part) of a tertiary amine such as benzyldimethylamine.

Specific examples of the preparation of the encapsulating material of this invention follow:

Example 1

25.8 parts of the condensation product of epichlorhydrin and 2,2 - bis(4 - hydroxyphenyl) propane (bisphenol A). For example, Shell Chemical Co. Epon 826 Liquid Epoxy ether resin with epoxide equivalent weight of 175–190.

19.4 parts of the condensation product of epichlorhydrin and tetrabrominated bisphenol A. For example, Dow Chemical Co. Epoxy Resin #542 with an epoxide equivalent weight of 350–400.

19.3 parts of epoxy resin made from epichlorhydrin and C18-dicarboxylic acid, for example Epon 871, product of the Shell Chemical Co. The above ingredients are combined at a temperature of 60–80° C. and are mixed well to a homogeneous mass. The mixture is cooled to 40° C. and 35.5 parts of hexahydrophthalic anhydride are added and again mixed well. To the above resulting mixture is added 25.0 parts of a fibrous calcium silicate filler, for example Wollastonite F-1, 10 parts of antimony oxide and 90 parts silica flour. The mixture is well agitated to disperse and wet out the filler and the mixture is evacuated at 2.5 mm. of mercury in order to remove excess air.

If the mixture is rapidly cooled at this point, it has a pot life of 2–10 days depending upon the storage temperature and humidity. Prior to actual use, the mixture is reheated to 60°–80° C. and a small amount of a teritary amine is added, 0.3 part of benzyldimethylamine per 100 parts of compound being typical. The mixture is finally cured by treating for 8–16 hours at about 250° F.

It should be mentioned that the addition of fibrous calcium silicate fillers lessens the stresses caused by thermal cycling. Because of the fact that most epoxy compounds have a much higher coefficient of thermal expansion than do most metals, temperature change in a final coil arrangement wherein metal is embedded in the epoxy can weaken the structure. The addition of the fibrous calcium silicate, however, provides reduced dimensional change as a result of temperature change, yet permits a lower pouring viscosity than other presently available fibrous fillers.

It should also be understood that the ratios of the various resins involved may be varied from the percentages or parts above listed. In addition other fillers and curing agents can be used. Examples are given below:

Example 2

Example #2 is identical to the above described Example #1 with the exception that instead of 90 parts silica flour and 25 parts of fibrous calcium silicate filler, 160 parts of silica flour are used.

Example 3

Example #3 is identical to Example #1 with the exception that the silica flour and the calcium silicate is replaced by 100 parts of ground mica. Also carbon black is added to a desired degree as a color pigment.

Example 4

Example #4 is identical to Example #1 with the exception that 41.0 parts of nadic methyl anhydride (methyl bicyclo (2.2.1)-heptene-2,3-dicarboxylic anhydride) are added to the mixture instead of hexahydrophthalic anhydride.

Example 5

Example #5 is identical to Example #1 with the exception that 0.2 part of 2,4,6-tri(dimethylaminomethyl) phenol, for example, Rohm and Haas DMP-30 is used instead of the benzyldimethylamine.

Example 6

It is also possible to obtain desired results with other basic approaches, one of which would involve the use of the following ingredients mixed and processed similarly to the above described examples:

| | Parts |
|---|---|
| Epichlorhydrin-bisphenol A copolymer | 55 |
| Epichlorohydrin-tetrabrominated bisphenol A copolymer | 45 |
| Polyazelaic polyanhydride | 54 |
| Silica flour | 150 |
| Dimethylaminomethylphenol | 0.75 |

It has been found that the above set forth formulations are self-extinguishing and have impact and thermal shock resistance with better thermal stability and processing characteristics than most similar materials.

It will be evident from the above description that the present invention provides a coil arrangement wherein the coil wrapper and the enclosure of the coil are combined. It will also be evident that the present invention provides a coil arrangement which eliminates the use of flux bars and the like as well as the use of complete metallic enclosures as ultimate enclosures. It should also be pointed out that the present invention provides a coil arrangement which is flame retardant and which has impact resistance and electrical and thermal properties making poossible the coil arrangement meeting the Underwriters' Laboratories requirements for Class A and Class B coils.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention and the scope of the claims are also desired to be protected.

The invention claimed is:

1. A coil arrangement comprising a bobbin having an aperture therethrough, a coil on said bobbin; encapsulating material surrounding said coil and bobbin; a mounting element formed of ferrous material in the shape of an encircling strip extending around said encapsulating material, said encapsulating material being flame resistant and of high impact resistance, said strip being fixed to said encapsulating material and providing a pair of return flux paths for the coil, said encapsulating material being exposed on the opposite sides of said strip, said strip having a generally constant width and a sufficiently less thickness than width that it is capable of being bent to angles approximating 90 degrees without fracture of the strip; an internally threaded collar fixed to said strip, said collar having an internal shoulder against which an externally threaded conduit can be tightly screwed; and lead wires extending from said coil through said encapsulating material, strip and collar; said encapsulating material, strip and collar shielding and protecting said lead wires.

2. The coil arrangement of claim 1 wherein said encapsulating material has a generally cylindrical shape approximating the shape of said bobbin but rectangular in shape at the portion of the material where said lead wires leave said encapsulating material, said encapsulating material being formed with an integral raised collar on said rectangular shape, said strip comprising a sheet metal ferrous yoke having a flat rectangular base and a pair of flat legs having the same width as said base and projecting perpendicularly from the opposite ends of said base, said legs having circular apertures therethrough and slots from the distal ends of said legs to said leg apertures, said encapsulated bobbin and coil being received within said yoke with the aperture through said bobbin aligned with said leg circular apertures, a pair of longitudinally split cylindrical members resiliently deformed to narrow said split and press fitted within the ends of said coil and said leg apertures to mount said coil on said yoke, said cylindrical members having radially outwardly projecting protuberances on both sides of said legs to secure said cylindrical members in place, said strip further comprising a conduit attachment fixed to said yoke, said conduit attachment having a flat rectangular base and a pair of flat legs having the same width as said base, said attachment legs being fixed to said yoke legs and said attachment base having said collar fixed thereto.

3. The coil arrangement of claim 1 wherein said encapsulating material has an aperture through the central portion thereof coextensive with the axial aperture through said bobbin, said encapsulating material having enlarged rounded end portions joined by said central portion, said enlarged end portions defining flanges which surround said central portion, said strip having a flat rectangular base and a pair of flat legs having the same widths as said base and projecting perpendicularly from the opposite ends of said base, said collar being fixed to said base, said legs having distal ends which are punched out to form openings through one of said distal ends and tabs projecting from the other of said distal ends, said strip embracing said central portion of said encapsulating material with said strip engaging said flanges, said leg distal ends being bent over to engage one another and to cause said projections to extend through said openings securing said strip around said central portion, said legs having apertures coextensive with said encapsulating material apertures.

References Cited by the Examiner

UNITED STATES PATENTS

| | | | |
|---|---|---|---|
| 1,815,380 | 7/1931 | Porter et al. | 336—67 X |
| 2,772,296 | 11/1956 | Mueller. | |
| 2,775,742 | 12/1956 | Bogue et al. | 336—96 X |
| 2,940,986 | 6/1960 | Newey. | |
| 3,028,539 | 4/1962 | Wright | 336—96 X |
| 3,036,246 | 5/1962 | Valleau | 336—67 X |
| 3,121,192 | 2/1964 | Tuzinski | 336—96 X |

LARAMIE E. ASKIN, *Primary Examiner.*

ROBERT K. SCHAEFER, *Examiner.*

D. J. BADER, *Assistant Examiner.*